United States Patent Office 3,824,238
Patented July 16, 1974

3,824,238
METHOD FOR THE PURIFICATION OF 7-AMINO-DESACETOXYCEPHALOSPORANIC ACID
Friedrich Dursch, Hopewell, and Theodore Michael Siewarga, Parlin, N.J., assignors to E. R. Squibb & Sons, Inc., Princeton, N.J.
No Drawing. Filed Apr. 5, 1972, Ser. No. 241,425
Int. Cl. C07d 99/24
U.S. Cl. 260—243 C                    9 Claims

ABSTRACT OF THE DISCLOSURE

Purified 7-aminodesacetoxycephalosporanic acid may be obtained as a crystalline, free flowing white powder with an iron content of less than 10 p.p.m. by reprecipitation from a mildly basic aqueous solution from which impurities have been removed by treatment with a selective solvent, adsorbent or the like.

BACKGROUND OF THE INVENTION

7-Aminodesacetoxycephalosporanic acid, frequently referred to as 7-ADCA, is an important intermediate for the production of various cephalosporin antibiotics. For this application of 7-ADCA, it is desirable to use the substance in a pure state.

7-ADCA may be produced by a number of methods described in the chemical literature. For example, 7-aminocephalosporanic acid may be hydrogenolyzed in a solvent over nobel metal catalysts. Or, an ester of 7-ADCA may be cleaved by appropriate treatment, e.g., reaction of the $\beta,\beta,\beta$-trichloroethyl ester of 7-ADCA with zinc in a lower aliphatic acid, or reaction of the p-methoxybenzyl ester of 7-ADCA with trifluoroacetic acid.

These reactions furnish 7-ADCA along with varying amounts of contaminants, i.e., unreacted intermediates and by-products of the chemical reactions. Frequently, metal contaminants, e.g., zinc, iron and other heavy metals, are carried along with the crude 7-ADCA as it is isolated from these manufacturing processes.

7-ADCA contains a $\beta$-lactam group. This structural unit is known to be sensitive to attack by nucleophiles, e.g., hydroxyl ion, ammonia and organic amines. Treatment of 7-ADCA with nucleophiles would be expected to lead to decomposition of the molecule by alteration of the $\beta$-lactam group. Since 7-ADCA is amphoteric and is stable in acid solution, previous efforts to purify the substance have been directed at acid solutions.

We have discovered, however, that solubilization of 7-ADCA in water by treatment with nucleophiles, preferably bases, can be used as a key step in a process for purification of 7-ADCA, with excellent yields of purified product.

The essence of the method of the invention consists of this sequence of steps:

(1) Raising the pH of an aqueous slurry of 7-ADCA sufficiently to effect solubilization of the solids,
(2) Treating the resulting aqueous solution of 7-ADCA to remove contaminants, and
(3) Recovering pure 7-ADCA from the treated solution by lowering the pH and by collecting the resulting crystals.

DETAILED DESCRIPTION OF THE INVENTION

We have found that the recovery of pure 7-aminodesacetoxycephalosporanic acid (7-ADCA) may be effected by a particular sequence of steps in the treatment of the crude mixture obtained by a method such as those described above.

The sequence, outlined above, involves first treating an aqueous slurry of crude 7-ADCA, obtained for example, as described above, and containing various contaminants from the production procedure, with a base so that the solids, except some contaminants, are in solution. A slurry containing about 2 to 20% by weight of 7-ADCA in water may be used. The pH of an impure aqueous slurry containing 7-ADCA may vary from about 2 to 6. This aqueous slurry is treated with a base like ammonia; alkali metal hydroxide, e.g., sodium hydroxide, potassium hydroxide; alkali metal carbonates, e.g., sodium carbonate; basic phosphates, e.g., alkali metal phosphate such as trisodium phosphate; or an organic amine, e.g., lower alkyl amines like butylamine, t-octylamine, diethylamine, trimethylamine, triethylamine, lower alkanolamines, like ethanolamine; strongly basic heterocyclic amines, like N-methylmorpholine or piperidine. Ammonia is the preferred base.

In this step, the base is added to the slurry until solution or suspension of the solids is obtained. This generally occurs when the solution becomes mildly alkaline, e.g., up to a pH of about 7.5. It is desirable not to substantially exceed this pH. Solutions of the base as concentrated as possible are preferably used. Organic bases may be used as such. The inorganic bases may be used in the form of concentrated aqueous solutions containing up to about 60% of the base. Ammonia may be used in the form of ammonium hydroxide, e.g., containing about 10 to 30% ammonia, preferably about 20 to 30%.

The mildly basic solution containing the contaminants in solution or in suspension is particularly amenable to the removal of the contaminants by solvent extraction, adsorption or treatment with a chelating agent. The agent used for removal of the contaminants depends in large measure on the nature of the impurities, and one or more of these types of purification agents may be utilized.

The organic solvents of limited water solubility which may be used include esters, e.g., alkyl esters such as isobutyl acetate; ethers, e.g., dialkyl ethers such as isopropyl ether; ketones, e.g., dialkyl ketones such as methyl isobutyl ketone; hydrocarbons, e.g., aromatic hydrocarbons such as toluene; and chlorinated solvents, e.g., chloroform. Chelating agents which may be used include citric acid, nitrilotriacetic acid and EDTA. Adsorbents include activated carbon, diatomaceous earth and adsorbing resins, resins of the styrene-divinylbenzene type such as XAD resins of Rohm and Haas.

Especially valuable is the treatment of the aqueous solution of 7-ADCA with activated carbon. This is particularly useful since it removes iron and other heavy metals virtually quantitatively.

As a final step, the pH of the treated solution is lowered to within the range of 6 to 3, preferably about pH 4. The product then crystallizes in the form of easily filtered particles. The recovery of pure 7-ADCA by this method is excellent; activity yields of over 95% being achieved.

The reduction in pH is effected by treating the solution with aqueous acid solution, e.g., a mineral acid like hydrochloric, nitric or phosphoric acids or with an organic acid like formic or acetic acids. The organic acids may be used as such. Inorganic acids are used in as high a concentration as convenient. The acid is best added slowly.

The entire procedure may be effected at ambient temperature or under moderate cooling or heating.

The following examples are illustrative of the invention.

Example 1

Crude 7-ADCA (100 grams), assaying about 90% pure by light absorption and by non-aqueous titration, and containing about 150 ppm. of iron, are added to 2 liters of distilled water. The slurry is agitated and concentrated aqueous ammonia is added slowly without exceeding pH 7.5. A hazy solution is obtained. Activated carbon (50 grams; Darco G60) is added and the mixture is agitated for 20 minutes at room temperature. Filter aid (50 grams, Hyflo Super-Cel) is added and the mixture is filtered through an asbestos pad (Seitz K5). The filter cake is washed with 100 ml. of distilled water. Filtrate and wash are combined and are agitated gently while concentrated hydrochloric acid is added dropwise. The addition is interrupted for about 30 minutes after pH 6.0 to 6.2 is reached in order to allow slow initial crystal growth. Subsequently, more acid is added slowly to a final pH 4.0. The resulting crystal slurry is agitated for another hour and is filtered at room temperature. The crystals are washed on the filter with 1.5 liters of distilled water and are dried at room temperature under vacuum to remove the adhering water. The yield of pure 7-ADCA is 87 grams, assaying about 99% purity by chemical and physical methods, and containing less than 5 ppm. of iron. The recoverery of pure 7-ADCA is above 95% of the theoretical.

Example 2

Crude 7-ADCA (100 grams) of about 88% purity by physical and chemical assays and containing a substantial amount of 7-ADCA esters as contaminants is slurried with 0.5 liters of water. Aqueous sodium hydroxide solution (92 ml. of 20% w.v.) is added very slowly until the solid particles are substantially dissolved. The very turbid mixture at pH 7.8 is extracted with 2× 0.5 liters of isobutyl acetate. The aqueous phase is separated and polish filtered through a bed of Hyflo filter aid. The clear filtrate is agitated gently and concentrated hydrochloric acid is added dropwise. Crystallization begins immediately and is allowed to continue until 33.5 ml. of acid are consumed and the pH is 4.3. The aqueous slurry is filtered and the crystal cake is washed with 150 ml. of distilled water until the filtrate tests negative for chloride ion. The product is dried at room temperature in a fluidized bed dryer. Pure 7-ADCA (84.5 grams) is obtained which assays above 99° purity by chemical and physical methods. The recovery of 7-ADCA is 95% of the theoretical.

Example 3

A crude mixture from the production of 7-ADCA, containing about 18.5 grams of 7-ADCA by chromatographic assay, contaminated with large amounts of formic and acetic acids, zinc salts, and some 7-ADCA esters is stirred with 350 ml. of water. The acidic sludge is adjusted to pH 7.5 with triethylamine when the bulk of the solids have dissolved. The turbid mixture is filtered through a bed of Hyflo filter aid and the filtrate is extracted twice with 175 ml. of chloroform each. The aqueous phase is separated and is stirred with 5 grams of activated carbon. The slurry is treated with Hyflo filter aid and filtered. The clear filtrate is slowly adjusted to pH 4 with aqueous nitric acid. Colorless crystals separate during this operation. The product is isolated by filtration and is washed with 100 ml. of water. Vacuum drying of the filter cake affords 17 grams of pure 7-ADCA.

What is claimed is:

1. A process for the purification of 7-aminodesacetoxycephalosporanic acid contaminated with impurities including metal contaminants which comprises the sequence of steps (1) forming an aqueous slurry containing up to about 20% by weight of said impure compound, (2) adjusting the pH of said slurry to alkaline not in excess of pH 7.5 until the solids are in solution or suspension, (3) separating said impurities by solvent extraction, filtration, absorption or metal chelation, (4) readjusting the pH within the range of about pH 3 to 6 by acidification and (5) isolating purified crystalline 7-aminodesacetoxycephalosporanic acid.

2. A process as in Claim 1 wherein the pH adjustment in step (2) is effected with ammonia.

3. A process as in Claim 1 wherein the alkaline solution is treated in step (3) with adsorbent.

4. A process as in Claim 3 wherein the adsorbent is activated carbon.

5. A process as in Claim 1 wherein the pH adjustment in step (2) is effected with ammonia and the alkaline solution is treated with activated carbon.

6. A process as in claim 1 wherein the contaminants are removed in step (3) by solvent extraction.

7. A process as in Claim 6 wherein the solvent is isobutyl acetate.

8. A process as in Claim 1 wherein the aqueous slurry is treated in step (2) with aqueous ammonia, admixing the alkaline solution in step (3) with activated carbon, filtering and acidifying the filtrate in step (4) with hydrochloric acid, nitric acid, phosphoric acid, formic acid or acetic acid.

9. A process as in Claim 8 wherein the acid is hydrochloric acid.

References Cited

UNITED STATES PATENTS 3,507,860   4/1970   Wetherill et al. __ 260—243 C
3,531,481   9/1970   Pfeiffer et al. _____ 260—243 C NICHOLAS S. RIZZO, Primary Examiner U.S. Cl. X.R.

260—239.1, 306.7